United States Patent [19]
Covey et al.

[11] Patent Number: 6,111,587
[45] Date of Patent: *Aug. 29, 2000

[54] METHOD FOR CONVERTING NON-ZERO WINDING TO EVEN-ODD FILL POLYGONS

[75] Inventors: Robert D. Covey; Ching-Chi Billy Hsu, both of Alameda, Calif.

[73] Assignee: Autodesk, Inc., San Rafael, Calif.

[*] Notice: This patent is subject to a terminal disclaimer.

[21] Appl. No.: 08/967,621

[22] Filed: Nov. 12, 1997

Related U.S. Application Data

[63] Continuation-in-part of application No. 08/855,713, May 8, 1997.

[51] Int. Cl.$^7$ .................................................. G06T 11/80
[52] U.S. Cl. ........................... 345/435; 345/434; 345/441; 345/443
[58] Field of Search ........................... 345/434, 435, 345/441, 443

[56] References Cited

U.S. PATENT DOCUMENTS

| | | | |
|---|---|---|---|
| 4,958,305 | 9/1990 | Piazza | 345/434 |
| 5,438,656 | 8/1995 | Valdes et al. | 345/443 |
| 5,818,460 | 10/1998 | Covey et al. | 345/443 |

*Primary Examiner*—Mark K. Zimmerman
*Assistant Examiner*—Lance W. Sealey
*Attorney, Agent, or Firm*—Gates & Cooper

[57] ABSTRACT

The present invention discloses a method, apparatus, and article of manufacture for converting Non-Zero Winding to Even-Odd rule polygons, regardless of their shapes. Convex, concave, self-intersecting, and polygons with holes can all be converted from Non-Zero Winding to Even-Odd fill rule polygons. The invention accepts Non-Zero Winding fill polygons and computes all intersection points between the polygons. An initial intersection point between a first polygon and a second polygon is selected. The perimeter of either the first or second polygon is traced beginning from the selected intersection point. The trace switches between the perimeters of the first and second polygons as additional intersection points are reached during the tracing. The tracing is terminated when the selected intersection point is encountered by the tracing step. These steps are then repeated until all intersection points between the first and second polygons have been encountered.

15 Claims, 7 Drawing Sheets

Even-Odd Fill

Non-Zero Winding Fill

Non-Zero Winding Fill

Even-Odd Fill

FIG. 3B

Non-Zero Winding Fill

FIG. 3C

Non-Zero Winding Fill

Winding Filled - 600   Even-Odd Filled - 602   Output - 604

FIG. 6

METHOD FOR CONVERTING NON-ZERO WINDING TO EVEN-ODD FILL POLYGONS

CROSS RELATED INVENTIONS

This is a continuation-in-part application under 37 C.F.R. §1.53(b)(1) of copending and commonly assigned patent application Ser. No. 08/855,713, filed on May 8, 1997, by Robert D. Covey and Ching-Chi Billy Hsu, and entitled "A METHOD FOR PERFORMING POLYGON SET OPERATIONS ON POLYGONAL REGIONS," which application is incorporated by reference herein.

BACKGROUND OF THE INVENTION

1. Field of the Invention.

This invention relates generally to a computer graphics system, and more particularly, to a method for converting Non-Zero Winding fill polygons to Even-Odd fill rule polygons.

2. Description of Related Art.

In the field of computer graphics, Non-Zero Winding and Even-Odd are two common fill rules used to determine whether a region of a polygon is inside or outside. These two methods each enable distinct descriptions of polygons. However, they pose an extra burden in creating generic computer algorithms for polygons. No exchange method exists for converting one rule to the other. Therefore, a computer program designer has to expand his logic to accommodate both cases. This logic expansion complicates the design and at times may prevent reuse of computer programs.

Thus, there is a need in the art for an invention that converts Non-Zero Winding fill polygons to Even-Odd fill polygons. Additionally, the invention should remove any inside edges of a Non-Zero Winding rule polygon. This means that the output of the invention only consists of the actual border or outside edges of a polygon. Redundant points are removed.

SUMMARY OF THE INVENTION

To overcome the limitations in the prior art described above, and to overcome other limitations that will become apparent upon reading and understanding the present specification, the present invention discloses a method, apparatus, and article of manufacture for converting Non-Zero Winding to Even-Odd rule polygons, regardless of their shapes. Convex, concave, self-intersecting, and polygons with holes can all be converted from Non-Zero Winding to Even-Odd fill. The invention accepts Non-Zero Winding fill polygons and computes all intersection points between polygons. The polygons consist of one or more contours, where a contour is defined as a single closed loop boundary that encloses an area. An initial intersection point between the first contour of the first polygon and the second contour of the second polygon is selected. The perimeter of either the first or second polygon is traced beginning from the selected intersection point. The trace switches between the perimeters of the first and second contours as additional intersection points are reached during the tracing. The tracing is terminated when the selected intersection point is encountered by the tracing step. These steps are then repeated until all intersection points between the first and second polygons have been encountered.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides enhancements to computer-assisted drafting (CAD) software. More specifically, the present invention provides enhancements to drafting, drawing or graphics software that graphically represent Non-Zero Winding fill polygons. Given Non-Zero Winding fill polygons, the present invention determines the region or regions that represent the interior of the polygons, removes edges that do not contribute to the border of the final result, and outputs an equivalent representation of the original polygons in Even-Odd fill format. The polygons may be convex, concave, or self-intersecting, and may contain holes. The present invention simplifies computer software that supports both Non-Zero Winding and Even-Odd fill rules, removes unneeded interior edges, and encourages code reuse.

Hardware Environment

Figure 1:
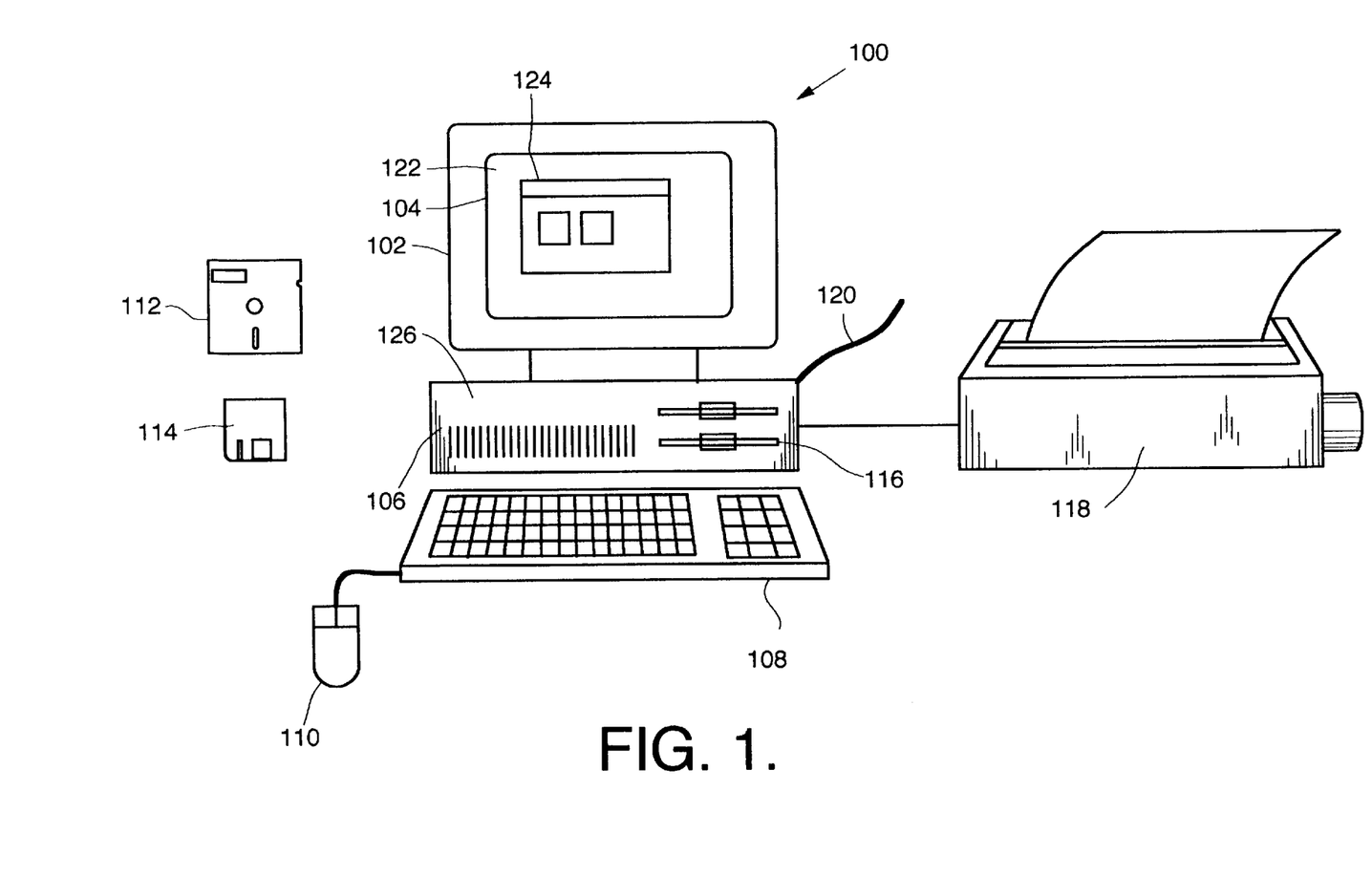
FIG. 1 illustrates an exemplary hardware environment that could be used with the present invention.

FIG. 1 illustrates an exemplary hardware environment 100 that could be used with the present invention. The exemplary hardware environment 100 comprises a computer 106 coupled to I/O devices comprising a monitor 102, a keyboard 108, a mouse device 110, and a printer 118. The computer 106 could also be coupled to other I/O devices, including a local area network (LAN) or wide area network (WAN) via interface cables 120 and data communication devices (e.g., modems, network interfaces, etc.).

The computer 106 comprises a processor and a memory including random access memory (RAM), read only memory (ROM), and/or other components. The computer 106 operates under control of an operating system 122 stored in the memory to present data to the user on the monitor 104 and to accept and process commands from the user via keyboard 108 and mouse device 110.

The present invention is preferably implemented in one or more computer programs or applications, which are depicted as windows 124 presented on the display 104. The computer programs 124 execute under the control of the operating system 122 and generally comprise computer-assisted drafting (CAD) programs, drawing programs, or graphics programs. Under the control of the operating system 122, the computer programs 124 may be loaded from the data storage devices, and/or remote devices into the memory of the computer 106 for use during actual operations. Generally, the operating system 122 and the computer programs 124 are tangibly embodied in and/or readable from a device, carrier, or media, and/or remote devices coupled to the computer with data communication devices. Those skilled in the art will recognize that the exemplary hardware environment 100 illustrated in FIG. 1 is not intended to limit the present invention. Indeed, those skilled in the art will recognize that other alternative hardware environments may be used without departing from the scope of the present invention.

Example of Converting Non-Zero Winding to Even-Odd Fill Polygons

Figure 2:
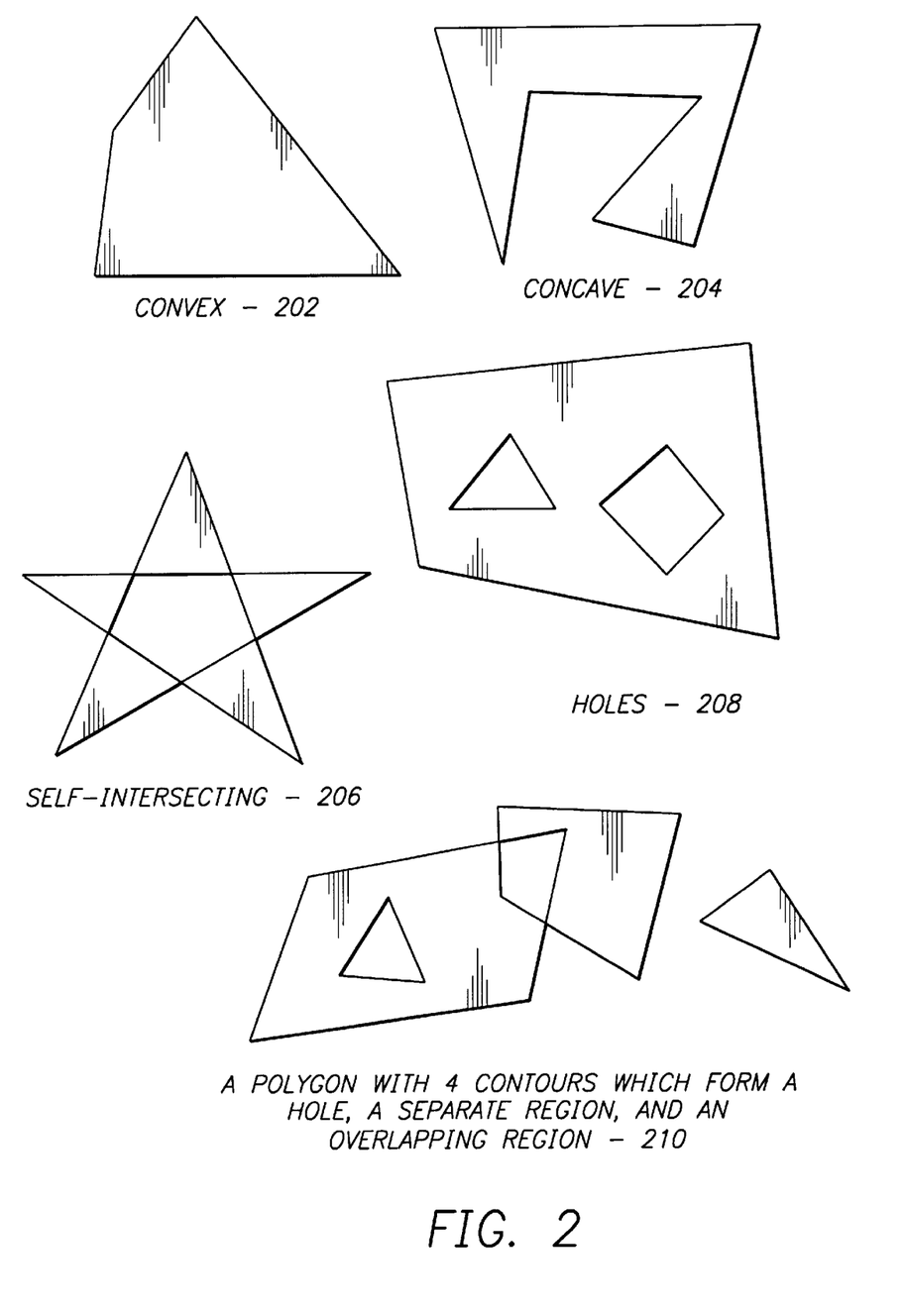
FIG. 2 is a block diagram that illustrates an example of the information displayed by the computer programs on the monitor according to the present invention.

FIG. 2 is a block diagram that illustrates an example of the information displayed by the computer programs 124 on the monitor 104 according to the present invention. In this example, a number of different types of polygonal regions are displayed on the monitor 104 by the computer programs 124, wherein a polygonal region is a closed figure bounded by straight lines. The region may be convex 202, concave 204 or self-intersecting 206 and it may contain holes 208. The region may also be a polygon with four contours which form a hole, a separate region, and an overlapping region 210.

A subregion of the polygons displayed can further be defined as a contour which is a single closed loop of straight edges. These edges may cross each other create holes or define unconnected regions. A polygon, therefore, consists of one or more contours.

Figure 3A:
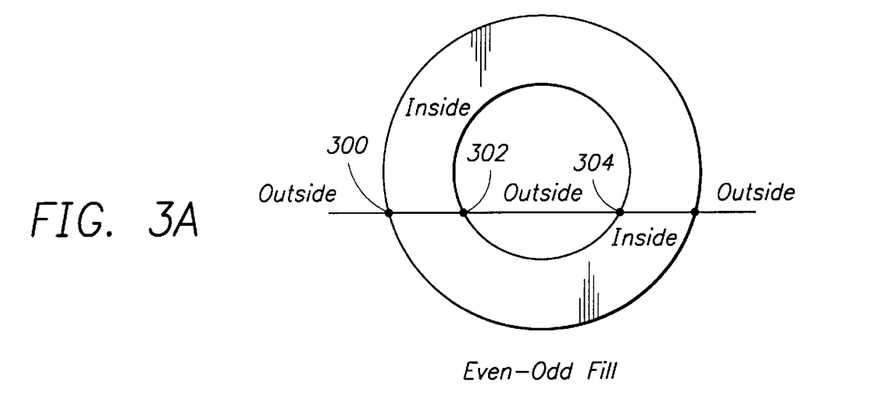
FIGS. 3A–3C illustrates how Even-Odd and Non-Zero Winding fill rules determine the interior regions of a polygon.
Figure 3B:
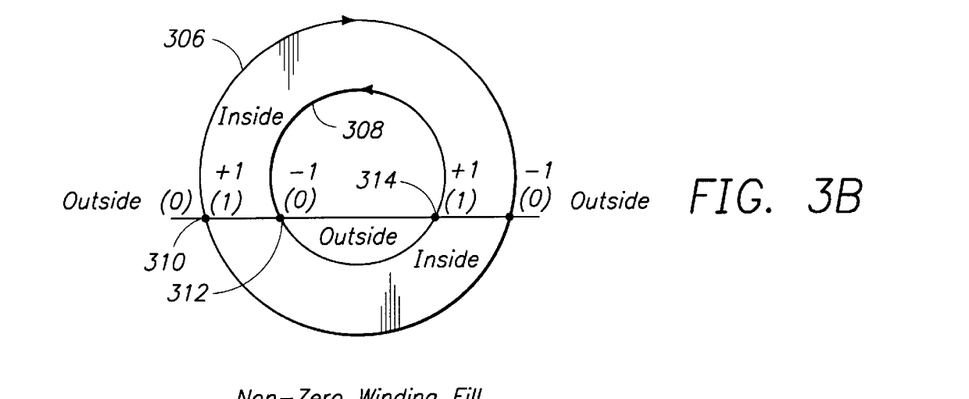
Figure 3C:
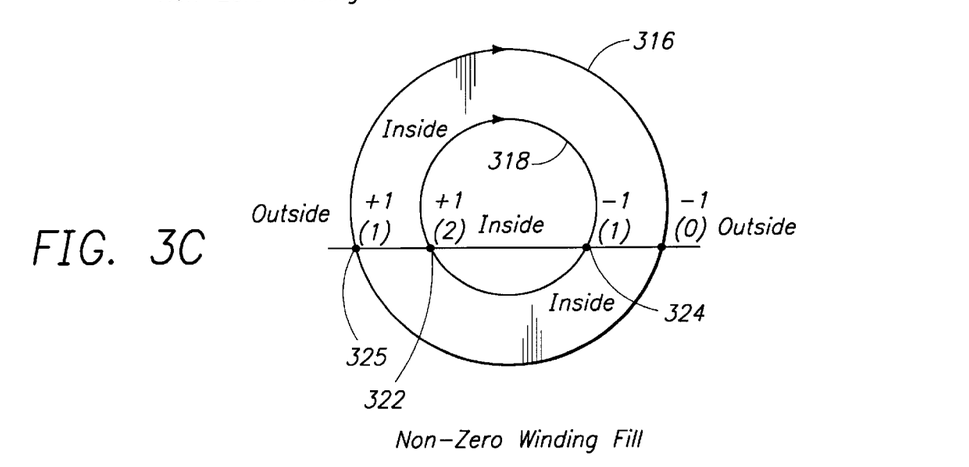

FIGS. 3A–3C illustrate how the present invention determines if a point is inside or outside of a polygon. In particular, the present invention uses either the Even-Odd fill rule or the Non-Zero Winding fill rule to determine if a point is inside or outside of a polygon.

FIG. 3A shows an example of the Even-Odd fill rule. This rule chooses an initial contour edge and alternates between outside regions and inside regions as contour edges are crossed. In FIG. 3A, the invention applies the Even-Odd fill rule by selecting an initial edge 300. The open spaced region to the left of the edge is considered an outside region. The region located in-between the initial edge 300 and the second edge 302 is considered an inside region. The region located in-between the second edge 302 and the third edge 304 is considered an outside region. The invention continues to alternate between inside regions and outside regions until all edges have been reached.

The Non-Zero Winding fill rule chooses an initial edge and sets an initial value with respect to the direction of the contour. The rule then adds or subtracts "1" as each edge is crossed, depending on the direction of the contour. If the current count is "0", the region is considered an outside region. In FIG. 3B, the invention represents the outside contour 306 in a clockwise direction and the inside contour 308 in a counter-clockwise direction. The clockwise direction is associated with a "+1" value and the counter-clockwise direction is associated with a "−1" value. The open spaced region to the left of the first edge 310 has a current count of "0", hence the region is considered an outside region. The region located in-between the first edge 310 and the second edge 312 has a current count of "1," therefore it is considered an inside region. The region located in-between the second edge 312 and the third edge 314 has a current count of "0" and is considered an outside region. The invention continues to add or subtract "1" as each edge is crossed until all edges have been reached.

Unlike FIG. 3B, FIG. 3C illustrates two contours represented in the same direction. Both the outside contour 316 and inside contour 318 are represented in a clockwise direction. The clockwise direction is associated with a "+1" value. The open spaced region to the left of the initial edge has a current count of "0", hence the region is considered an outside region. The region located in-between the first edge 320 and the second edge 322 has a current count of "1," therefore it is considered an inside region. The region located in-between the second edge 322 and the third edge 324 has a current count of "2" and is also considered an inside region. The invention continues to add or subtract "1" as each edge is crossed until all edges have been reached.

Flowcharts

Figure 4A:
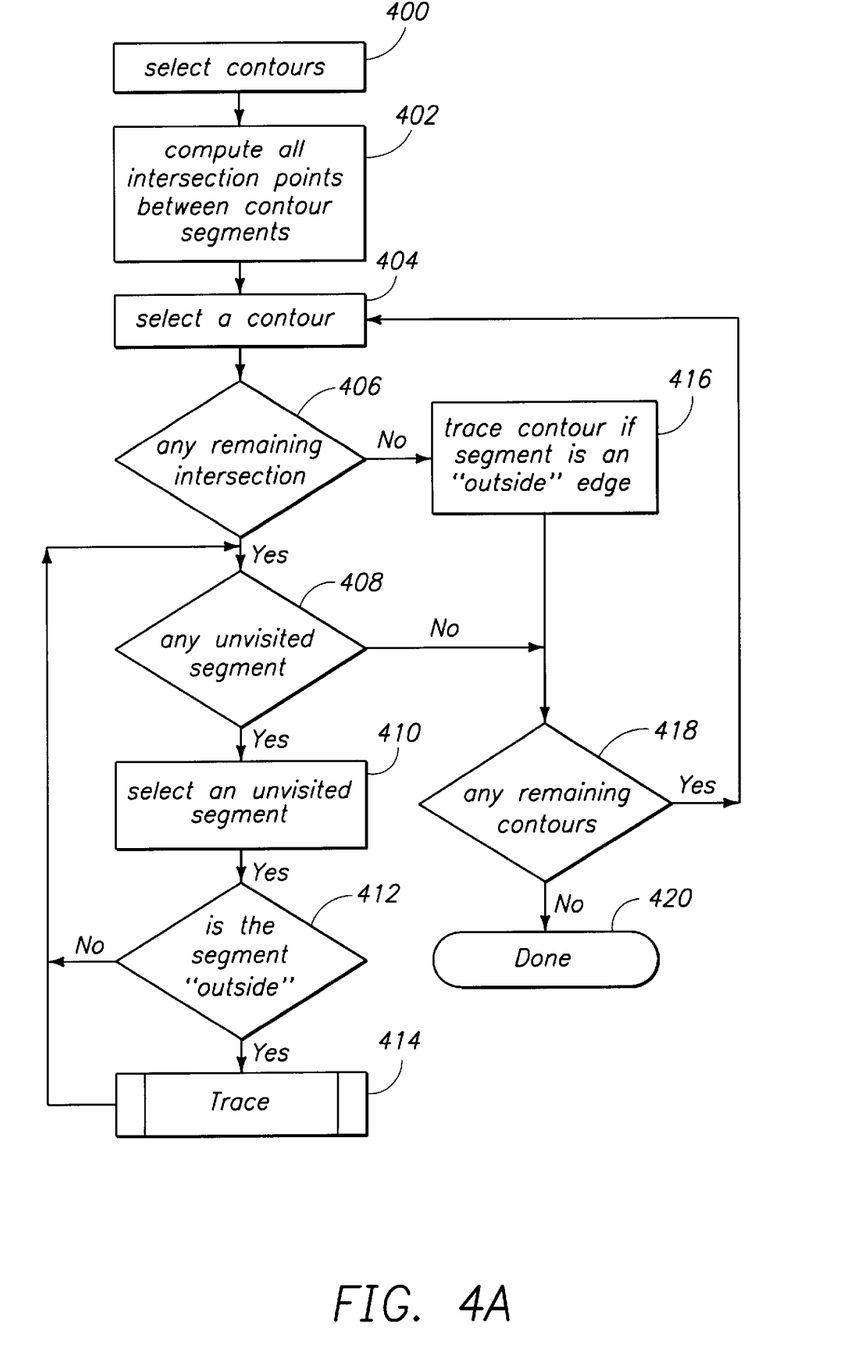
FIGS. 4A and 4B are flowcharts depicting the logic performed by the computer programs according to the present invention.
Figure 4B:
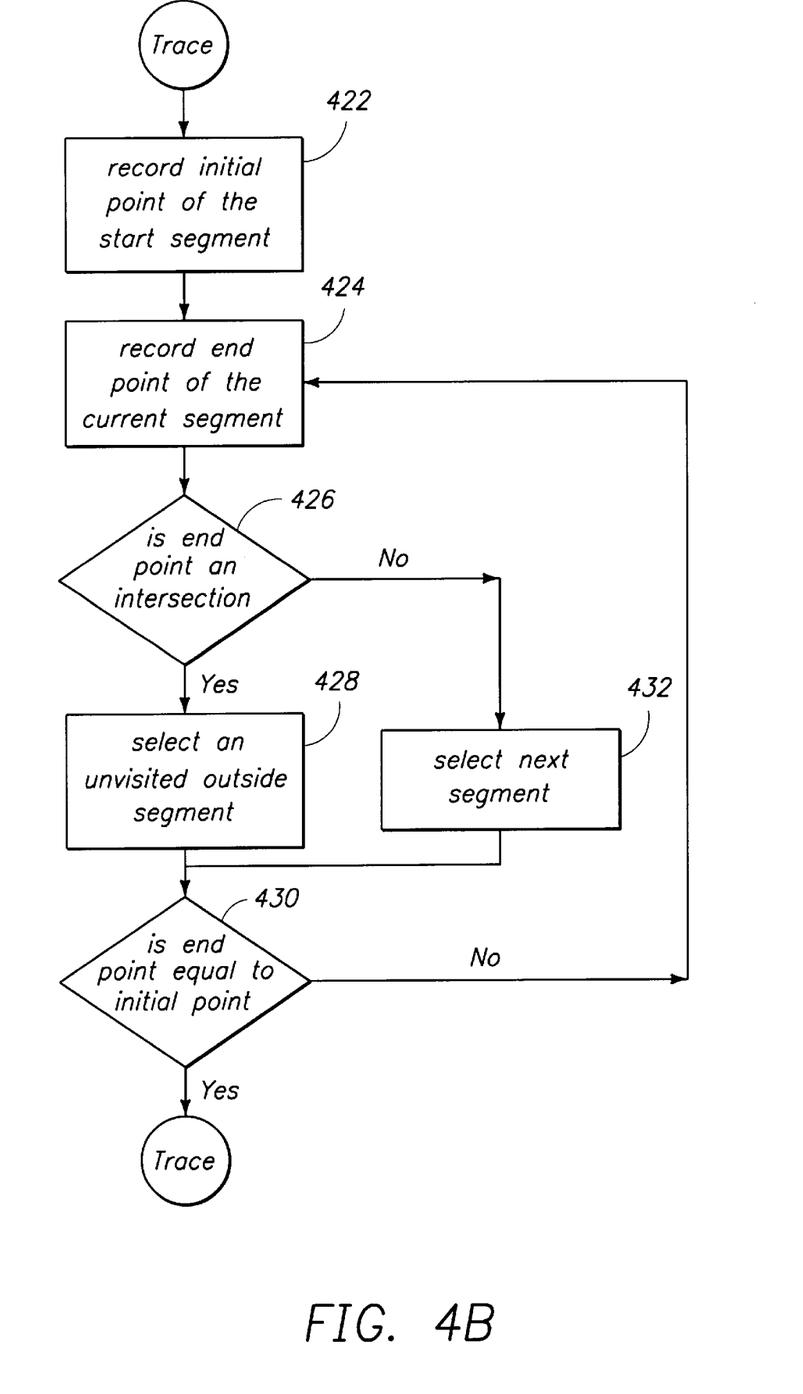

FIGS. 4A–4B are flowcharts that illustrate the logic performed by the computer programs 124 according to the present invention.

Polygon Set Operation Flowchart

In FIG. 4A, Block 400 represents the computer 106 selecting at least two contours on which to perform the following operations. These selections can be made manually in response to user inputs or automatically by the computer itself.

Block 402 represents the computer 106 computing all intersection points between the two contours. This selection can be made manually in response to user inputs or automatically by the computer 106 itself.

Block 404 represents the computer 106 selecting one of the contours. This selection can be made manually in response to user inputs or automatically by the computer 106 itself.

Block 406 is a decision block that represents the computer 106 determining whether any intersection points are on the selected contour. If so, control transfers to Block 408; otherwise, if no intersection points exist, control transfers to Block 416.

Intersection Points on the Contour

Block 408 is a decision block that represents the computer 106 determining whether any contour segments have been unvisited. If so, control transfers to Block 410; otherwise, if no unvisited contour segments exist, control transfers to Block 418.

Block 410 represents the computer 106 selecting the unvisited segment between the selected polygons.

Block 412 is a decision block that represents the computer determining whether a contour segment is an outside edge. If so, control transfers to block 414. Otherwise, if a contour is not an outside edge, control returns to block 408.

Block 414 represents the computer 106 displaying the trace output region and returning control to Block 408.

If no unvisited contour segments exist on the selected contour the computer 106 transfers control from Block 408 to Block 418.

Block 418 is a decision block representing the computer 106 determining whether any remaining contours exist. If no, control transfers to Block 420 and the graphical representation of the conversion is achieved; otherwise, if remaining contours exists, control transfers to Block 404.

No Intersection Points on the Contour

If no intersection points exist on the selected contour, computer 106 transfers control from Block 406 to Block 416.

Block 416 represents the computer 106 tracing the outside edge of the selected contour.

Block 418 is a decision block that represents the computer 106 determining whether any remaining contours exist. If no, control transfers to Block 420 and the graphical representation of the conversion is achieved; otherwise, if remaining contours exists, control transfers to Block 404.

Trace Output Flowchart

FIG. 4B is a flowchart that illustrates the logic performed by the computer when tracing an output polygon.

Block 422 represents the computer 106 recording the initial point of the start segment.

Block 424 represents the computer 106 recording the end point of the current segment.

Block 426 is a decision block that represents the computer 106 determining whether an endpoint is an intersection. If so, control transfers to Block 428; otherwise, if the endpoint is not an intersection, control transfers to Block 432.

Block 428 represents the computer 106 selecting an unvisited outside segment.

Block 432 represents the invention selecting the next segment.

Block 430 is a decision block representing the invention determining whether an endpoint is equal to the initial point of the start segment. If so, the trace is completed. Otherwise, the invention returns control to Block 424.

Figure 5:
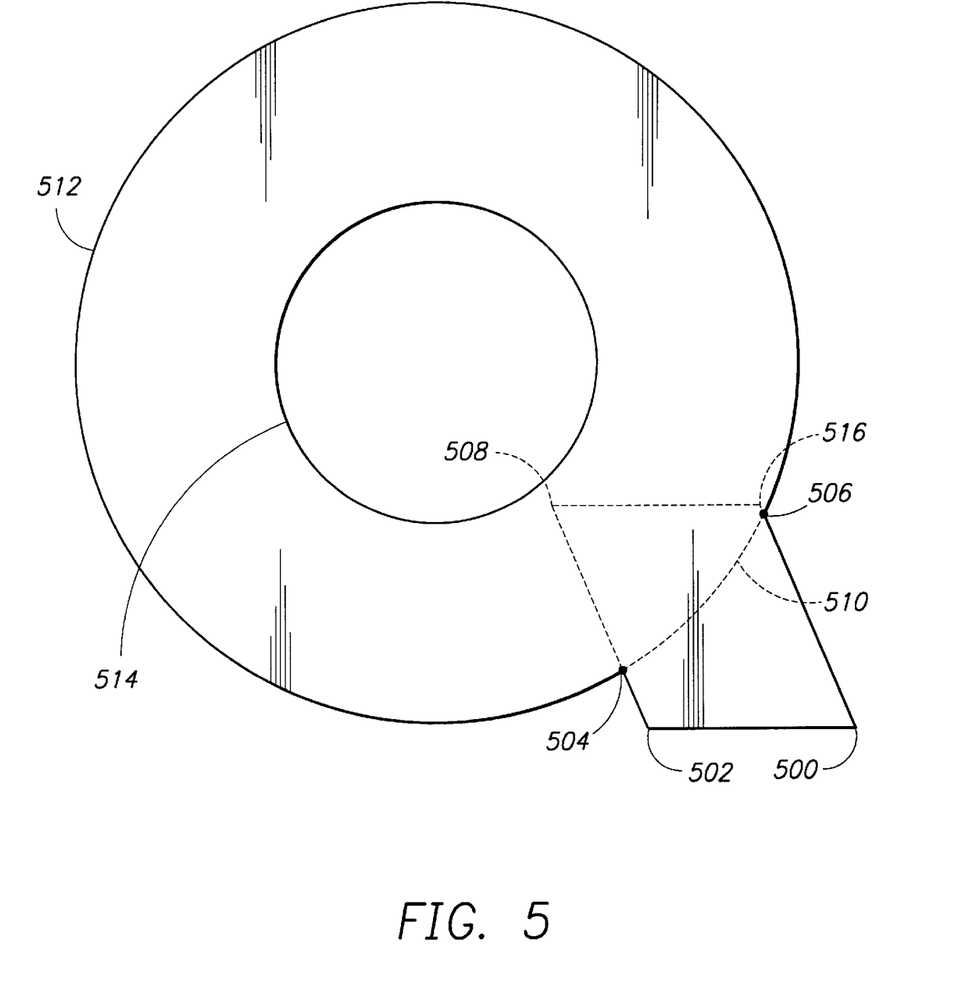
FIGS. 5 is an example of the functions performed by the computer programs on a Non-Zero Winding fill polygon according to the present invention.

An example of the trace output region is illustrated in FIG. 5. The invention starts by selecting a point on a contour, for instance, 500. Since the segments between 500, 502 and 504 are outside edges according to Non-Zero Winding fill rule outlined in FIG. 3, they are recorded. The trace now reaches 504 which is an intersection. There are three possible segments to follow from 504. However, only 512 is outside; thus the trace records 512 and moves on to 506. Again, 506 is an intersection and the only outside edge is to 500, where the trace originates. The segment between 506 and 500 is recorded. The trace checks if there are unvisited points in the same contour. Yes, 508 and 516 are unvisited. The trace selects 508, and continues the process. Segments 508 to 516, 516 to 506, and 508 to 502 are all inside and segment 506 to 500, 500 to 502, and 502 to 504 are all visited so there is nothing to record. All points in this contour have been examined and the trace moves on to the next contour. The trace picks another point in another contour, 506, but all points in this contour, 506, 504 and 512 have all been processed. Nothing to record either. The trace moves on to the last contour 514. There is no intersection in this contour. The trace performs a single test with any segment in 514 and finds it is part of the border, i.e. outside. All points in the contour are recorded. No contour remains and the trace finishes.

Figure 6:
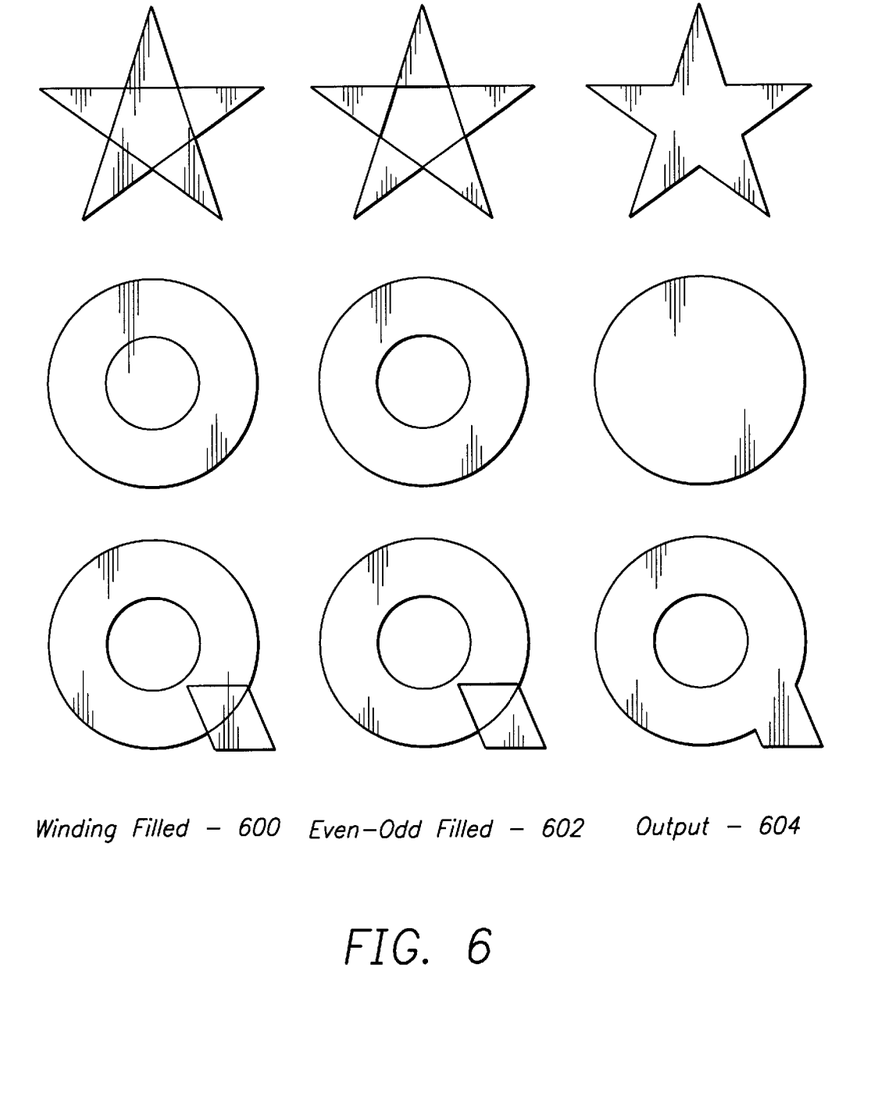
FIG. 6 compares shapes described in Non-Zero Winding, Even-Odd, and output from this invention after being Even-Odd filled.

FIG. 6 compares shapes described in Non-Zero Winding fill format 600, Even-Odd fill format 602, and output 604 from this invention after being Even-Odd filled. Note that the output 604 is equivalent to the original winding filled 600 without redundant edges.

Conclusion

This concludes the description of the preferred embodiment of the invention. The present invention discloses a method, apparatus, and article of manufacture for converting Non-Zero Winding fill polygons to Even-Odd fill rule polygons, regardless of their shapes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for converting Non-Zero Winding fill polygons to Even-Odd fill polygons, comprising the steps of:

(a) computing all intersection points between two or more Non-Zero Winding fill polygons, wherein the Non-Zero winding fill polygons each comprise at least one contour, the contour being a single closed loop boundary that encloses an area of the Non-Zero Winding fill polygon;

(b) selecting an initial intersection point between a first contour of a first polygon and a second contour of a second polygon;

(c) selecting a contour for tracing;

(d) tracing a perimeter of the selected contour beginning from the initial intersection point;

(e) switching between the perimeters of the first and second polygons as additional intersection points are reached during the tracing step (d);

(f) terminating the tracing step (d) and the switching step (e) when the initial intersection point is encountered by the tracing step (d); and (g) repeating steps (d)–(g) until all intersection points between the first and second contours have been encountered.

2. The method of claim 1 above, wherein the switching step (e) comprises the step of consecutively tracing the perimeters of the first and second contours.

3. The method of claim 1 wherein the tracing step (d) further comprises tracing only an outside edge of a contour.

4. The method of claim 1 above, wherein the contours are selected from a group comprising a convex, a concave, and a self-intersecting contour.

5. The method of claim 4 above, wherein the contours are comprised of one or more holes.

6. An apparatus for converting Non-Zero Winding fill polygons to Even-Odd fill polygons, comprising:

(a) a computer;

(b) means, performed by the computer, for:

(1) computing all intersection points between two or more Non-Zero Winding fill polygons, wherein the Non-Zero Winding fill polygons each comprise at least one contour, the contour being a single closed loop boundary that encloses an area of the Non-Zero Winding fill polygon;

(2) selecting an initial intersection point between a first contour of a first polygon and a second contour of a second polygon;

(3) selecting a contour for tracing;

(4) tracing a perimeter of the selected contour beginning from the initial intersection point;

(5) switching between the perimeters of the first and second polygons as additional intersection points are reached during the tracing step (4);

(6) terminating the tracing step (4) and the switching step (5) when the selected intersection point is encountered by the tracing step (4); and (7) repeating steps (4)–(7) until all intersection points between the first and second contours have been encountered.

7. An article of manufacture comprising a program storage medium readable by a computer, the medium tangibly embodying one or more programs of instructions executable by the computer to perform method steps for converting Non-Zero Winding fill polygons to Even-Odd fill polygons, the method comprising the steps of:

(a) computing all intersection points between two or more Non-Zero Winding fill polygons, wherein the Non-Zero Winding fill polygons each comprise at least one contour, the contour being a single closed loop boundary that encloses an area of the Non-Zero Winding fill polygon;

(b) selecting an initial intersection point between a first contour of a first polygon and a second contour of a second polygon;

(c) selecting a contour for tracing;

(d) tracing a perimeter of the selected contour beginning from the initial intersection point;

(e) switching between the perimeters of the first and second polygons as additional intersection points are reached during the tracing step (d);

(f) terminating the tracing step (d) and the switching step (e) when the initial intersection point is encountered by the tracing step (d); and (g) repeating steps (d)–(g) until all intersection points between the first and second contours have been encountered.

8. The apparatus of claim 6 above, wherein the means for switching (5) comprises means for consecutively tracing the perimeters of the first and second contours.

9. The apparatus of claim 6 wherein the means for tracing (4) further comprises means for tracing only an outside edge of a contour.

10. The apparatus of claim 6 above, wherein the contours are selected from a group comprising a convex, a concave, and a self-intersecting contour.

11. The apparatus of claim 10 above, wherein the contours are comprised of one or more holes.

12. The article of manufacture of claim 7 above, wherein the switching step (e) comprises the step of consecutively tracing the perimeters of the first and second contours.

13. The article of manufacture of claim 7 wherein the tracing step (d) further comprises tracing only an outside edge of a contour.

14. The article of manufacture of claim 7 above, wherein the contours are selected from a group comprising a convex, a concave, and a self-intersecting contour.

15. The article of manufacture of claim 14 above, wherein the contours are comprised of one or more holes.

* * * * *